Figure 1:
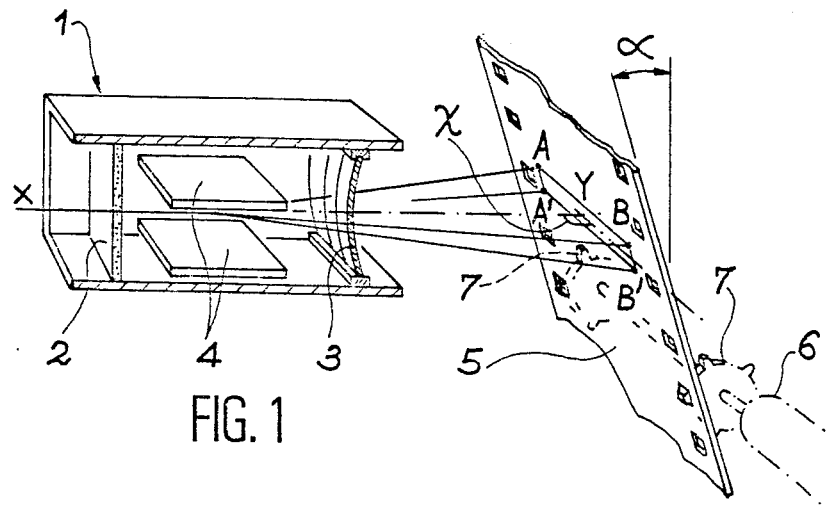

United States Patent [19]

Balanzat et al.

[11] Patent Number: 4,832,997
[45] Date of Patent: May 23, 1989

[54] PRODUCTION OF ASYMMETRICAL MICROPOROUS MEMBRANES BY DOUBLE IRRADIATION AND ASYMMETRICAL MEMBRANES

[75] Inventors: Emmanuel Balanzat, Caen; Claude Bieth, Troarn, both of France

[73] Assignee: Commissariat a l'Energie Atomique & Centre National de la Recherche Scientifique, Paris, France

[21] Appl. No.: 123,574

[22] Filed: Nov. 20, 1987

[30] Foreign Application Priority Data

Nov. 20, 1986 [FR] France ............................. 86 16163

[51] Int. Cl.$^4$ ............................. B44C 1/22; B32B 3/10
[52] U.S. Cl. ..................................... 428/131; 156/628; 156/643; 156/644; 156/654; 156/663; 156/668; 250/492.1; 428/315.5
[58] Field of Search ............... 156/628, 643, 644, 654, 156/662, 663, 668, 651; 250/492.1, 492.2, 492.3; 428/131, 134, 135, 158, 304.4, 315.5–315.7

[56] References Cited

U.S. PATENT DOCUMENTS

| | | | |
|---|---|---|---|
| 3,303,085 | 2/1967 | Price et al. | 161/109 |
| 3,415,993 | 12/1968 | Fleischer et al. | 156/644 X |
| 3,612,871 | 10/1971 | Crawford et al. | 250/83 |
| 3,616,049 | 10/1971 | Moore et al. | 156/345 |
| 3,770,532 | 11/1973 | Bean et al. | 156/644 X |
| 3,802,972 | 4/1974 | Fleischer et al. | 156/644 X |

FOREIGN PATENT DOCUMENTS 1375204 11/1974 United Kingdom .

OTHER PUBLICATIONS

IEEE Transactions on Nuclear Science NS-28(2), 1448-1451(1981) R. Spohr, "Heavy Ion Nuclear Tracks-An Emerging Technology".

Primary Examiner—William A. Powell
Attorney, Agent, or Firm—Michael N. Meller

[57] ABSTRACT

Process for the production of asymmetrical microporous membranes by double irradiation.

A membrane (5) is exposed to two irradiations, whereof one has an inadequate energy level to pass through the same, whereas the other passes through membrane (5).

The irradiations produce molecular defects, which are attacked or etched in preferred manner by certain chemical agents. Thus, two networks of pores are obtained, one network being of large diameter and of a non-issuing nature (26), the other being smaller (27, 28, 29) and which issue on to the two surfaces (31, 32) of membrane (5).

Application to filtration and sterilization.

10 Claims, 2 Drawing Sheets

PRODUCTION OF ASYMMETRICAL MICROPOROUS MEMBRANES BY DOUBLE IRRADIATION AND ASYMMETRICAL MEMBRANES

The present invention relates to a process for the production of asymmetrical microporous membranes by the double irradiation of particles and in particular heavy ions, as well as microporous asymmetrical membranes having a double network of pores.

Microporous membranes, which are more particularly usable in the filtration field, can be produced with particles which produce chains of defects in the glass, crystal or polymer membrane corresponding to the path of the particles. These defects make the areas round them very sensitive to certain chemical agents. An exposure of relatively short duration to these agents makes it possible to produce pores at the particle passage locations. A longer exposure makes it possible to expand these pores, but at a much slower speed. The duration of chemical attack or etching consequently makes it possible to control the diameter of the pores produced, i.e. the filtration characteristic of the filter.

However, in numerous applications, the flowrate of the fluid filtered by these membranes may be adequate and then several possibilities exist. It is firstly possible to reduce the thickness of the membrane, but this would be detrimental to its mechanical strength. It is also possible to increase the membrane porosity, i.e. the number of pores per surface unit. It is sufficient to irradiate for a longer time and with a higher particle rate. However, as the distribution of the impact is irregular and obeys statistical laws, the probability of multiple impacts very close to one another is very high. Such impact groups would give a single wider pore after chemical etching, which would lead to a filter with an inferior selectivity, because larger suspended corpuscles would occasionally pass through it.

The present invention consequently relates to a process for the production of microporous membranes making it possible to filter at least pores having a reduced length without excessively reducing the thickness and mechanical strength of the membrane and without excessively increasing the porosity. This process is characterized in that it comprises a first irradiation of the membrane to be treated by particles having an inadequate energy to pass through it, a second irradiation of the membrane by particles having an adequate energy to pass through it and at least one chemical etching process making it possible to obtain a double network of pores at the locations traversed by the irradiation particles, the pores of the first network having a larger diameter and issuing on to a surface of the membrane, whilst the pores of the second network have a smaller diameter and issue on to both surfaces of the membrane.

The invention also relates to the membranes satisfying this description.

In numerous cases, the irradiation processes can be performed by heavy ions from a particle accelerator.

Figure 2:
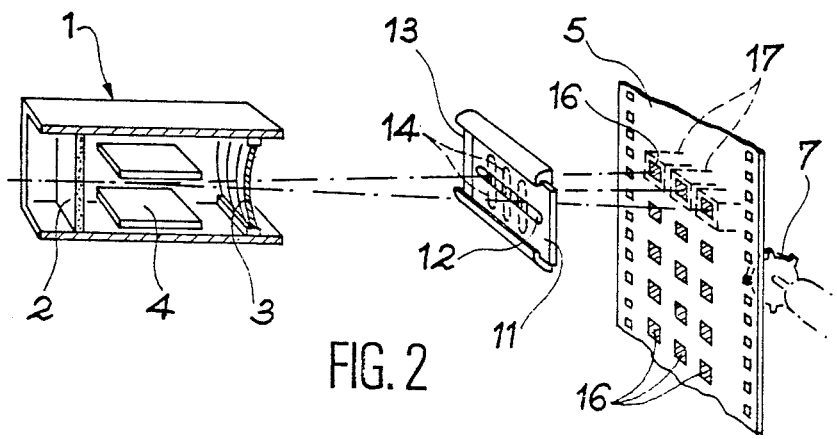

The process according to the invention will now be described in greater detail hereinafter relative to non-limitative embodiments and the attached drawings, wherein show:

FIGS. 1 and 2 Two possible irradiation modes usable according to the invention.

Figure 3:
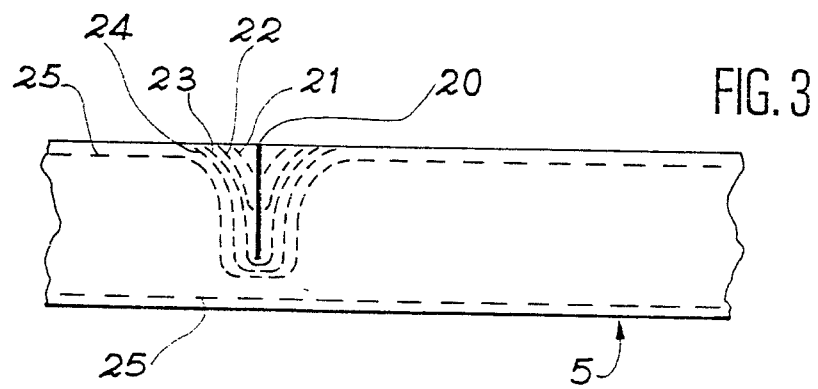

FIG. 3 A diagram for performing the chemical etching of a membrane at the location of an irradiation.

Figure 4:
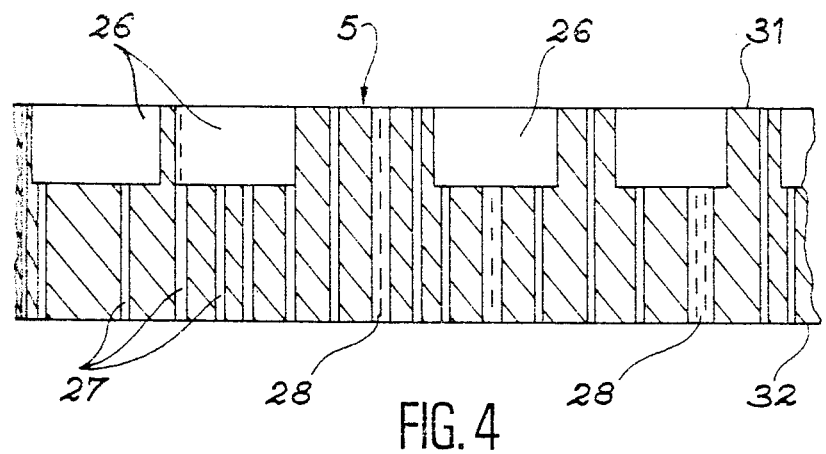
Figure 5:
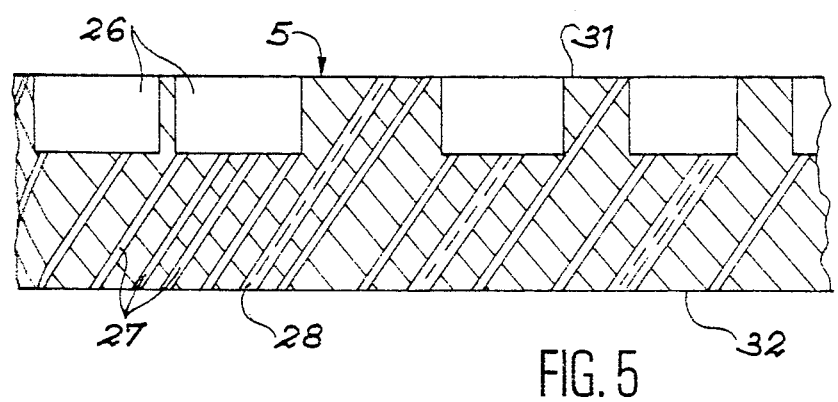
Figure 6:
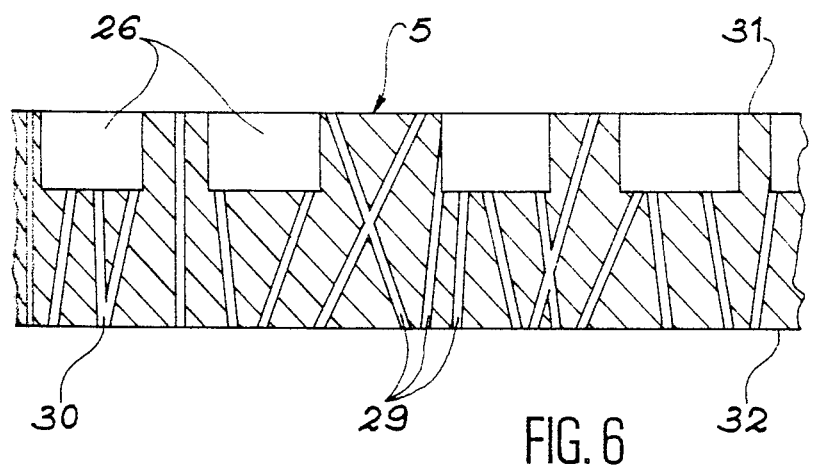

FIGS. 4, 5 and 6 The section of three membranes obtained according to the invention, but with differently performed irradiations.

On referring to FIG. 1, it is possible to see the end of a particle accelerator 1, generally using higher energy heavy ions, such as those of e.g. krypton or argon, successively provided with a carbon sheet 2 which traps part of the electron cloud of ions forming the beam and consequently increases the electric charge thereof, a magnet 4 producing a time-variable magnetic field and which therefore deflects the ion beam to a greater or lesser extent and a tight wall 3 making it possible, in the case of an acceptable reduction of the energy of the ions, to place the membrane 5 to be irradiated in the ambient air or in an oxygen atmosphere which will make chemical etching easier. A periodic magnetic field modulation using magnet 4 makes it possible to irradiate by a transverse scan a strip ABA'B' on membrane 5, whose width AA' is dependent on the divergence of the ion beam. An interesting operating condition from the economic standpoint is that the length of the scan AB is considerable which can be more easily achieved by increasing the electric charge of the ions and therefore by facilitating the deviation thereof. This justifies the carbon sheet 2, which can in the case of a well chosen thickness convert an $Ar^{6+}$ ion beam into a beam consisting solely of ions $Ar^{16+}$, $Ar^{17+}$, $Ar^{18+}$.

The ion source can be continuous or intermittent. In the first case, it is necessary for the scan to constantly maintain the same speed on the outward and return path in order to obtain a uniform irradiation of the surface of the membrane 5. In the second case, the scans must be synchronized with the beam emission periods.

The beam can irradiate membrane 5 with a longitudinal incident $\alpha$, which can be controlled by the user. Membrane 5 is mobile and passes longitudinally in front of the beam in a direction perpendicular to the scan direction AB, which can be simply brought about by a motor 6 moving a double gear 7, which meshes in notches of membrane 5. The advance of membrane 5 must be sufficiently slow to enable a regular irradiation of the beam. It can be continuous in the case of a continuous source, but can also take place in steps between two scans in the case of an intermittent source. $\chi$ is the transverse incidence and $\chi$ the angle defined by the mean direction XY of the ion beam and the strip ABA'B and which is also chosen by the user.

A second possible mode for the irradiation of a membrane by an ion beam is shown in FIG. 2. On the basis thereof, two parallel screens 11, 13 are placed between the particle accelerator 1 and the membrane 5. One of these screens 11 carries a slot 12 traversed by the beam during its scan, whereas the other screen 13 has several slots 14 perpendicular to slot 12. As a result, the beam can only irradiate membrane 5 over isolated zone 16, whereof the dimension and position are determined by the intersections of slot 12 and slots 14. The irradiation intensity is essentially dependent on the speed of scan and on the beam particle rate. It can be controlled for each of the zones 16 by a detector 17 placed behind membrane 5 in the case where the ions are sufficiently accelerated to completely traverse the same.

The irradiation of the well defined zones 16 requires that the advance of membrane 5 is only performed between two scans of the beam. It is then advantageous to interrupt the emission of said beam. The corresponding synchronization is easy to realize, e.g. by means of a microprocessor and will not be described here.

Reference is now made to FIG. 3, which explains the performance of the chemical etching of a membrane 5 subject to irradiation. In this case only a single impact is shown and it is assumed that the particle has not been raised to a sufficient energy to completely traverse said membrane 5. However, it has produced a certain number of defects in the molecular structure of the membrane 5 close to its path 20. These defects are very sensitive to certain chemical products, which firstly cause a puncture 21 on the surface of the membrane 5 and whereof the advance is faster close to path 20, where the molecular defects are larger than in the orthogonal directions. Thus, a puncture is obtained, whose depth increases rapidly and whose diameter increases more slowly, as is illustrated by lines 22, 23 which show the stages of its growth.

When the chemical etching is performed on the entire path or trajectory 20, its advance is increasingly slow, and after reaching line 24, only takes place on the healthy parts of membrane 5. The advance rate of the etching is then an order of magnitude lower and the entire surface in contact with the chemical product is etched at an approximately uniform speed, which means a supplementary enlargement of the pore created around the path 20 accompanied by a corresponding reduction in the thickness of membrane 5, as shown by line 25.

These explanations make it easier to understand the process for production of microporous membranes according to the invention and whereof embodiments are given in FIGS. 4 to 6. The most important characteristic is that two different irradiations are performed, namely one irradiation of the particles at a sufficiently low energy not to traverse membrane 5 and producing large diameter, non-issuing pores 26 following chemical etching, as well as an irradiation of particles with an adequate energy to traverse membrane 5 and produce small diameter, issuing pores 27 to 29, which in themselves make it possible to filter the fluid. It is desirable that the small diameter pores 27 to 29 issue in the largest possible number on to the large diameter pores 26 and not on to the surface 31, on to which issue the large diameter pores 26. The reduction in the average length of the small diameter pores 27 to 29 makes it possible, everything else being equal, to increase the fluid flowrate which can be filtered by membrane 5, whereas the use of a small thickness membrane leads to the same result, but to the detriment of the mechanical strength of the filter.

The membrane 5 shown in FIG. 4 is obtained with the aid of the equipment of FIG. 1 with a normal incidence of the beam ($\alpha=0$ and $x=90°$) for two irradiations.

A first low energy irradiation followed by an appropriate chemical etching makes it possible to obtain non-issuing pores 26 regularly disposed over surface 31. The etching agent can e.g. be soda and membrane 5 can be of polycarbonate.

It is clear that the obtention of large diameter pores 26 larger than 1/100 mm (10 $\mu$m), requires a prolonged chemical etching operation, whose corollary is a reduction in the thickness of membrane 5 by etching surface 31 and optionally the opposite surface 32. Thus, it is necessary to provide a thicker membrane 5 at the start of production than at the stage of the finished product.

Following chemical etching, membrane 5 is again positioned in accordance with FIG. 1 and undergoes a second irradiation of energy particles adequate to pass through the same. A second chemical etching then supplies pores 27, 28, which completely traverse membrane 4 and whose diameter, which conditions the duration of said etching, is determined by the use of the filter. The dimensions of the non-issuing pores 26 and the thickness of membrane 5 remain roughly constant during said etching, which is of much shorter duration than the first.

This process has two disadvantages. The first is that the small diameter pores 27, 28 are disposed in a random manner and that the proportion thereof issuing within the large diameter pores 26 does not exceed the porosity thereof on the surface 31. However, for mechanical reasons, said porosity cannot exceed 20 to 30%. The use of different incidence angles for the two irradiations makes it possible to obtain pores with non-parallel or oblique axes, depending on the type to which they belong (longitudinal incidences $\alpha$ or transverse incidences $\chi$ different for the two irradiations), which increases the probability of having small diameter pores 27, 28 issuing into large diameter pores 26.

FIG. 5 shows such a membrane 5. The small diameter pores 27, 28 have an obliquie axis with respect to the straight lines normal to the membrane 5.

However, another disadvantage remains. The very close together impacts occurring during the second irradiation can be the cause of junctions between groups of pores, which finally gives large diameter issuing pores 28, which reduce the selectivity of the filter by permitting, during filtration, the passage of corpuscles having a larger diameter than the issuing pores 27.

The improvement proposed consists of making the membrane 5 pass on two or more occasions in front of the ion beam at the time of producing pores issuing with angles $\chi$ between the mean direction XY of the ion beam and the direction of the membrane perpendicular to the passage direction, which are different. For example, $\chi_1 = 60°$ can be recommended for a first irradiation and $\chi_2 = 120°$ for a second. The probability of multiple pores is reduced, because pores coinciding on a surface 31 or 32 can then diverge and separate. In an equivalent manner, it is possible to modify the longitudinal incidence $\alpha$ for each passage of membrane 5. If there are numerous successive irradiations, the incidence of the particles on the membrane 5 can be considered as of a random nature, as can the axes of the small diameter pores 29. A thus obtained membrane 5 is shown in FIG. 6.

Another improvement, which can be combined with the first, relates to the production of the large diameter pores 26. The obtention of one of these pores with the aid of a single particle impact requires a long chemical etching process, which modifies the thickness of membrane 5. It may therefore be preferable to carry out this irradiation using the apparatus of FIG. 2. The irradiated zones 16 correspond to the dimensions and to the distribution of the pores 26 and are irradiated with a high particle density. A single subsequent chemical etching consequently brings about the formation of non-issuing pores, which very rapidly merge and give rise to large diameter pores 26. Apart from the rapidity of the process, the advantage is that of a perfect control of the regularity of distribution of said pores 26. The issuing pores 27 to 29 can optionally be obtained during the same chemical etching.

It is obvious that the invention is not limited to the embodiments described hereinbefore using particular equipment, but in general terms relate to the production of microporous membranes by double irradiation which, after chemical etching, leads to two networks of pores, the larger diameter pores not traversing the membrane.

In particular, the previous description has referred to the irradiations by heavy ion beams emitted by a particle accelerator. This choice is natural in numerous cases due to the fineness with which it is possible to regulate the energy of the beam and therefore the depth of the non-issuing pores and the penetrating power of the these particles. However, other irradiation types can be envisaged (e.g. fissile matter disintegration).

We claim:

1. A process for making an asymmetrical microporous membrane defined between a first surface and a second surface, which comprises:
    (a) first irradiating said membrane by using particle beams having sufficient energy only to penetrate a partial distance into said membrane in order to form a first set of pores which penetrate partially through said membrane;
    (b) second irradiating said membrane by using particle beams having sufficient energy to pass through the entire membrane in order to form a second set of pores which penetrate entirely through said membrane; and
    (c) etching said membrane by chemical means for obtaining a first network of said first set of pores and a second network of said second set of pores at the locations traversed by first and second irradiations of said membrane thereby to issue said first set of pores of said first network onto said first surface of said membrane only and said second set of pores of said second network onto both said first surface and second surface of said membrane; wherein at least a part of said second set of pores being issued on said second surface and on said first set of pores, the diameters of said first set of pores of said first network being larger than the diameters of said second set of pores of said second network.

2. The process according to claim 1, wherein etching said membrane comprises a first and a second etching, the first etching creating the first network of said first set of pores and the second etching creating the second network of said second set of pores, the first irradiation, first etching, second irradiation and second etching being carried out sucessively.

3. The process according to claim 1, wherein said first and second irradiations are carried out with heavy ions issued from a particle accelerator.

4. The process according to claim 1, wherein said particles used to penetrate said membrane in said first irradiation have a first incidence relative to said membrane and said particles used to penetrate said membrane in said second irradiation have a second incidence which differs from said first incidence.

5. The process according to claim 2, wherein said first and second irradiations are carried out with heavy ions issued from a particle accelerator.

6. The process according to claim 2, wherein said particles used to penetrate said membrane in said first irradiation have a first incidence relative to said membrane and said particles used to penetrate said membrane in said second irradiation have a second incidence which differs from said first incidence.

7. The process according to claim 2, wherein said particles used in said second irradiation have several incidences relative to said membrane.

8. An asymmetrical microporous membrane defined between a first surface and a second surface, which comprises a first network of pores issuing on said first surface only, and a second network of pores, at least a part of pores of said second network, issuing on said second surface and pores of said first network, the pores of said first network having a larger diameter than the pores of said second network.

9. The membrane according to claim 8, wherein said pores of said first network are directed differently than the pores of said second network.

10. The membrane according to claim 9, wherein said pores of said second network are directed in several directions.

* * * * *